(12) United States Patent
Otsuka et al.

(10) Patent No.: US 6,578,817 B2
(45) Date of Patent: Jun. 17, 2003

(54) SOLENOID VALVE

(75) Inventors: Yukinori Otsuka, Kanagawa (JP); Masahiko Hara, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 39 days.

(21) Appl. No.: 09/874,287

(22) Filed: Jun. 6, 2001

(65) Prior Publication Data

US 2001/0050347 A1 Dec. 13, 2001

(30) Foreign Application Priority Data

Jun. 8, 2000 (JP) ......................................... 2000-171407

(51) Int. Cl.[7] ............................................... F16K 31/02
(52) U.S. Cl. ............................ 251/129.02; 251/129.19; 335/279
(58) Field of Search ........................ 251/129.02, 129.19, 251/129.2, 129.15; 335/275, 276, 279

(56) References Cited

U.S. PATENT DOCUMENTS

| | | | | |
|---|---|---|---|---|
| 3,712,581 A | * | 1/1973 | Parlow | 251/129.15 |
| 3,970,282 A | * | 7/1976 | Hansen | 251/129.19 |
| 5,145,146 A | * | 9/1992 | Matsushima | 251/129.19 |
| 5,725,289 A | * | 3/1998 | Mueller et al. | 251/129.02 |
| 5,848,780 A | * | 12/1998 | Miller et al. | 251/129.15 |
| 5,879,060 A | * | 3/1999 | Megerle et al. | 251/129.02 |
| 5,890,876 A | * | 4/1999 | Suito et al. | 251/129.02 |
| 6,268,784 B1 | * | 7/2001 | Feigel et al. | 251/129.15 |
| 6,364,430 B1 | * | 4/2002 | Park | 251/129.02 |

OTHER PUBLICATIONS

Maisch, et al., "ABS5 and ASR5: The New ABS/ASR Family to Optimize Directional Stability And Traction", SAE Technical Paper Series, pp. 11–18, Int'l Congress and Exposition, Detroit, Michigan (Mar. 1–5, 1993).

* cited by examiner

*Primary Examiner*—Ehud Gartenberg
*Assistant Examiner*—John Bastianelli
(74) *Attorney, Agent, or Firm*—Foley & Lardner

(57) ABSTRACT

A solenoid valve includes a moving part, a plunger of magnetic material having one end facing an end face of the moving part, and a protrusion formed at the one end of the plunger and abutting on the end face of the moving part. During energization, a magnetic path is formed from a valve body to the moving part to produce an attraction force between the valve body and the moving part across a clearance. Magnetic flux running along the magnetic path becomes saturated at the protrusion.

16 Claims, 3 Drawing Sheets

SOLENOID VALVE

BACKGROUND OF THE INVENTION

The present invention relates generally to a solenoid valve, and more particularly to a normally open solenoid valve that is open during non-energization.

A typical normally open solenoid valve is described, for example, in TECHNICAL PAPER SERIES 930505 entitled "ABS5 and ASR5: The New ABS/ASR Family to Optimize Directional Stability and Traction", pp. 11–18, published by Society of Automotive Engineers (SAE). This solenoid valve comprises a roughly cylindrical valve body, a cylinder having an end closed by an end of the valve body fixed thereto by welding, a valve-seat member arranged in the valve body, a plunger slidably arranged in the valve body to have a front end with a valve part seated on the valve-seat member, a moving part slidably arranged in the cylinder to abut on a base end of the plunger, a spring interposed between the valve-seat member and the plunger to bias the plunger and the moving part in the valve-opening direction, and a coil wound on the outer periphery of the valve body and the cylinder. When energizing the coil, a magnetic path is formed from the solenoid yoke to the valve body through the moving part so as to produce an electromagnetic force, which moves the moving part against a biasing force of the spring, closing the valve.

In the above solenoid valve wherein energization of the coil creates magnetic path as described above, the plunger, located in the magnetic path, is made of a non-magnetic material such as stainless steel so as not to provide a magnetic force per se, securing the valve opening/closing responsibility, etc. Moreover, although the valve part of the plunger needs to have higher hardness due to repeated collision with the valve-seat member, the valve part of the plunger of non-magnetic material such as stainless steel is of lower hardness, requiring a particular treatment for increasing the hardness for the purpose of preventing wear.

As described, in the typical solenoid valve, the plunger is high in material cost due to use of a high-priced non-magnetic material, and has increased number of working processes due to need of a particular treatment for increasing the hardness, leading to the disadvantage in manufacturing cost.

SUMMARY OF THE INVENTION

It is, therefore, an object of the present invention to provide a solenoid valve that is free of the above disadvantage, and allows a reduction in manufacturing cost.

The present invention provides generally a valve arrangement, comprising:

a body with an end face;

a moving part slidably received in the body, the moving part being provided with an end face;

a plunger slidably received in the body, the plunger having one end fading an end face of the moving part, the plunger being formed out of a magnetic material; and a protrusion formed at the one end of the plunger, the protrusion abutting on the end face of the moving part.

One aspect of the present invention is to provide a solenoid valve, comprising:

a body with an end face;

a seat member slidably received in the body;

a moving part slidably received in the body, the moving part being provided with an end face;

a plunger slidably received in the body between the seat member and the moving part, the plunger having one end facing the end face of the moving part, the plunger being formed out of a magnetic material;

a protrusion formed at the one end of the plunger, the protrusion abutting on the end face of the moving part; and a valve part arranged at another end of the plunger, the valve part abutting on the seat member.

Another aspect of the present invention is to provide a valve arrangement, comprising:

a body with an end face;

a moving part slidably received in the body, the moving part being provided with an end face;

a plunger slidably received in the body, the plunger having one end facing an end face of the moving part, the plunger being formed out of a magnetic material; and a protrusion formed at the one end of the plunger, the protrusion abutting on the end face of the moving part, wherein a predetermined clearance is defined between the end face of the body and the end face of the moving part, wherein during energization, a predetermined magnetic path is formed from the body to the moving part, the predetermined magnetic path producing an attraction force between the body and the moving part across the predetermined clearance, the attraction force pressing the moving part toward the plunger to provide a closed valve state, wherein a predetermined magnetic flux running along the magnetic path becomes saturated at the protrusion, wherein the protrusion has a predetermined sectional area allowing saturation of the magnetic flux, and wherein the protrusion has a protrudent amount greater than the predetermined clearance.

A further aspect of the present invention is to provide a valve arrangement, comprising:

a body with an end face;

a moving part slidably received in the body, the moving part being provided with an end face;

a plunger slidably received in the body, the plunger having one end facing an end face of the moving part, the plunger being formed out of a magnetic material; and a protrusion formed at the one end of the plunger, the protrusion abutting on the end face of the moving part, wherein a predetermined clearance is defined between the end face of the body and the end face of the moving part, wherein during energization, a predetermined magnetic path is formed from the body to the moving part, the predetermined magnetic path producing an attraction force between the body and the moving part across the predetermined clearance, the attraction force pressing the moving part toward the plunger to provide a closed valve state, wherein a predetermined magnetic flux running along the magnetic path becomes saturated at the protrusion, wherein the protrusion has a predetermined sectional area allowing saturation of the magnetic flux, wherein the protrusion has a protrudent amount greater than the predetermined clearance, wherein the protrusion is arranged at a center portion of the plunger at the one end thereof, and wherein the protrusion is circular in cross section.

BRIEF DESCRIPTION OF THE DRAWINGS

The other objects and features of the present invention will become apparent from the following description with reference to the accompanying drawings wherein.

DETAILED DESCRIPTION OF THE INVENTION

Figure 1:
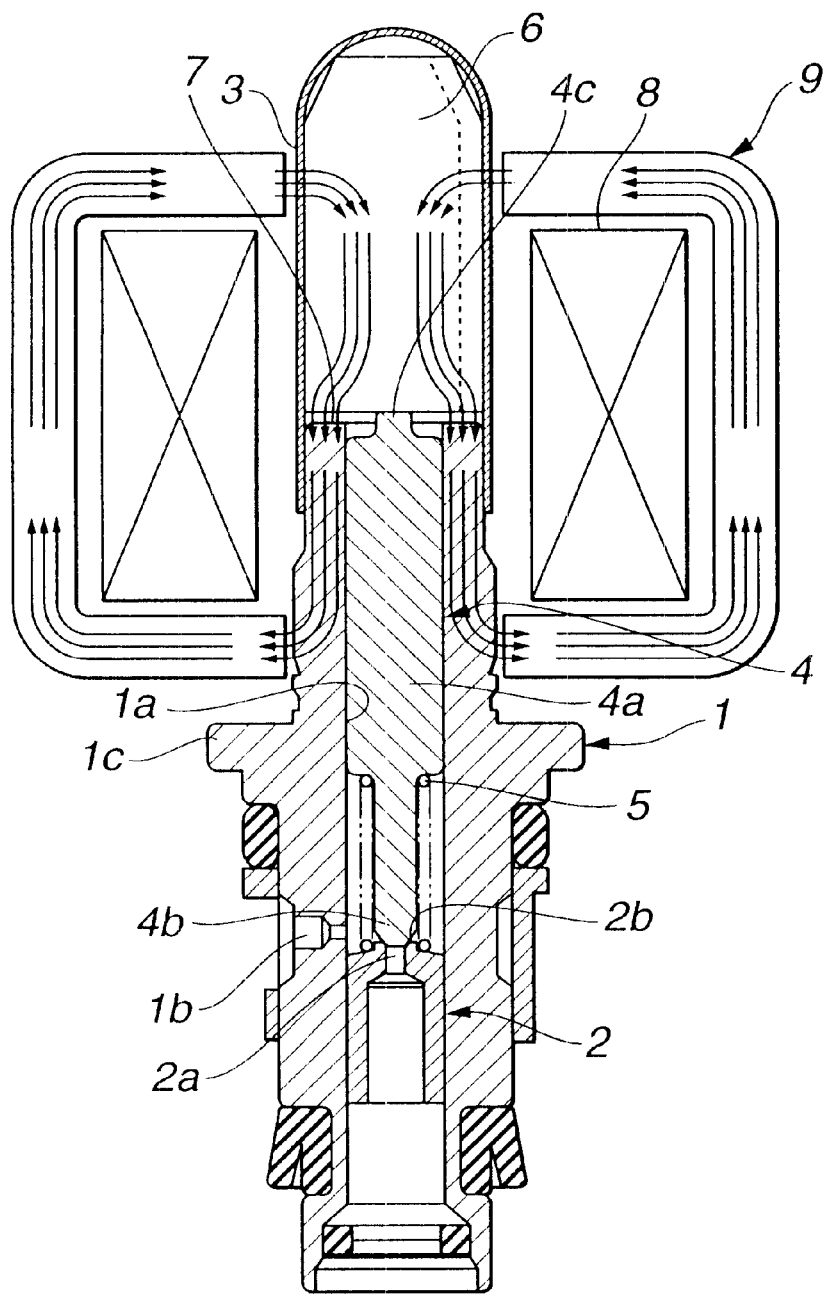
FIG. 1 is a sectional view showing a preferred embodiment of a solenoid valve according to the present invention.

Referring to the drawings, a solenoid valve embodying the present invention will be described. Referring to FIG. 1, the solenoid valve comprises a roughly cylinder-shaped valve body 1 and having a valve hole 1a formed axially and a communicating hole 1b formed in the middle to be orthogonal to the valve hole 1a. A flange 1c is outwardly formed with the valve body 1 in the middle thereof to engage with a housing, not shown, upon caulking.

A valve-seat member 2 is fitted in the valve hole 1a to be slightly below the communicating hole 1b of the valve body 1. A hole 2a is axially arranged through the valve-seat member 2, and a valve seat 2b is formed at the outer periphery thereof.

A cylinder 3 of thin circular tube having one end closed is fixed to an upper end of the valve body 1 by welding.

A plunger 4 is axially slidably received in the valve hole 1a. The plunger 4 is formed out of a magnetic material including carbon-containing metal such as iron, and comprises a cylinder-shaped main body 4a. Arranged at a lower end of the main body 4a is a valve seat 4b having a hemispherical front end seated on the valve seat 2b to provide the closed valve state, whereas arranged at an upper end thereof is a small-diameter cylinder-shaped protrusion 4c having a predetermined sectional area allowing saturation of magnetic flux as will be discussed below. The protrusion 4c is circular in cross section. In order to avoid the influence of a magnetic field, the protrusion 4c is preferably arranged maximally distant from the housing, i.e. a center portion of the plunger 4.

A spring 5 is interposed between the plunger 4 and the valve-seat member 2 to bias the plunger 4 in the valve-opening direction or upwardly.

Figure 2:
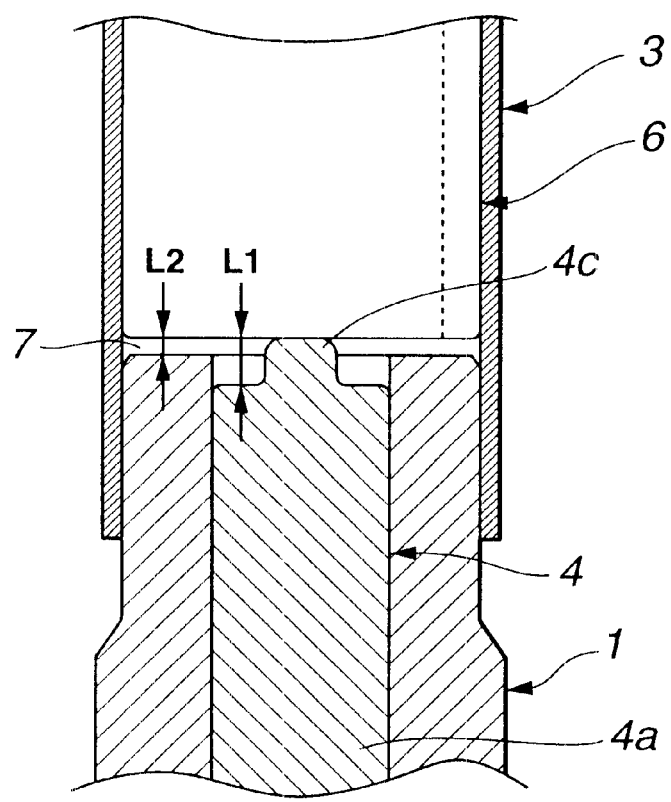
FIG. 2 is a fragmentary sectional view showing the solenoid valve.

A substantially cylindrical moving part 6 is arranged inside the cylinder 3 above the plunger 4. When the moving part 6 is lifted by a biasing force of the spring 5 through the plunger 4, a clearance 7 is defined between the moving part 6 and the upper end of the valve body 1. Referring to FIG. 2, an axial dimension or protrudent amount L1 of the protrusion 4c is greater than a dimension L2 of the clearance 7.

A coil 8 is wound on the outer periphery of the cylinder 3 and the upper end of the valve body 1.

Next, operation of the illustrative embodiment will be described.

During non-energization of the coil 8, the plunger 4 is disengaged from the valve-seat member 2 by a biasing force of the spring 5 so that the valve part 4b and the valve seat 2b are separated from each other, providing the open valve state.

During energization of the coil 8, a magnetic path, shown by arrows, is formed from the moving part 6 to the valve body 1 through a yoke 9 so as to produce thereby an attraction force between the valve body 1 and the moving part 6 across the clearance 7. This moves the plunger 4 downwardly against a biasing force of the spring 5 so that the valve part 4b abuts on the valve seat 2b, providing the closed valve state.

In the illustrative embodiment, the plunger 4 is formed out of a magnetic material, so that during formation of the above magnetic path, the path also passes through the plunger 4 toward the moving part 6. However, since this magnetic path is narrowed by the small-diameter protrusion 4c arranged at the upper end of the plunger 4, magnetic flux running along the path becomes saturated at the protrusion 4c to produce an attraction force in the plunger 4 itself, resulting in no degradation in plunger responsibility.

Further, in the illustrative embodiment, the protrusion 4c is preferably arranged maximally distant from the housing, i.e. the center portion of the plunger 4, avoiding the influence of a magnetic field.

Furthermore, in the illustrative embodiment, the axial dimension or protrudent amount L1 of the protrusion 4c is greater than the dimension L2 of the clearance 7, so that magnetic lines running from the moving part 6 to the plunger 4 are less than those running from the moving part 6 to the valve body 1. This can minimize a bad magnetic influence on the plunger 4.

Still further, in the illustrative embodiment, the plunger 4 has protrusion 4c arranged at the upper end to abut on the moving part 6 through the protrusion 4c. Thus, although the plunger 4 includes a magnetic material, magnetic flux becomes saturated at the protrusion 4c of the plunger 4, preventing degradation in plunger responsibility. This allows the use of a magnetic material of lower-priced and higher hardness in the plunger 4, leading to possible reduction in material cost. Moreover, this eliminates the need of treatment for increasing the hardness of the valve part 4b, obtaining reduced number of working processes, resulting in possible reduction in manufacturing cost.

Figure 3:
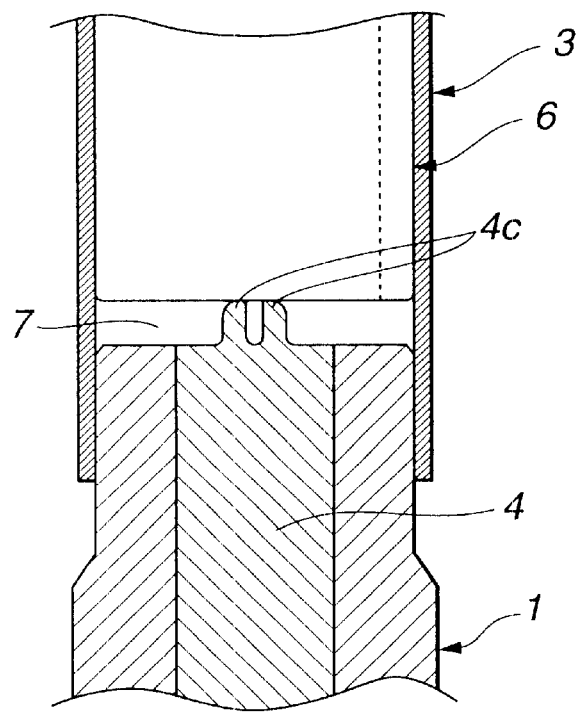
FIG. 3 is a view similar to FIG. 2, showing another embodiment of the solenoid valve.
Figure 4:
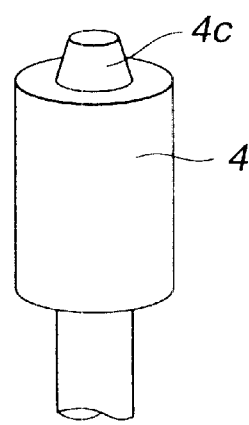
FIG. 4 is a perspective view showing still another embodiment of the solenoid valve.

Having described the present invention with regard to the preferred embodiment, it is understood that the present invention is not limited thereto, and various changes and modifications can be made without departing the scope of the present invention. By way of example, in the illustrative embodiment, a single protrusion 4c is formed at one end of the plunger 4. Optionally, referring to FIG. 3, a plurality of protrusions may be arranged in such a way as to be symmetrical with respect a plunger axis without being positioned axially. Moreover, referring to FIG. 4, in place of the cylinder shape, the protrusion 4c may be of the truncated cone. Furthermore, the plunger 4 may include other magnetic material than carbon-containing metal.

What is claimed is:

1. A valve arrangement, comprising:

a body with an end face;

a moving part slidably received in the body, the moving part being provided with an end face;

a plunger slidably received in the body, the plunger having one end facing an end face of the moving part, the plunger being formed out of a magnetic material; and a protrusion formed at the one end of the plunger, the protrusion abutting on the end face of the moving part, a predetermined clearance being defined between the end face of the body and the end face of the moving part, during energization, a predetermined magnetic path being formed from the body to the moving part, the predetermined magnetic path producing an attraction force between the body and the moving part across the predetermined clearance, the attraction force pressing the moving part toward the plunger to provide a closed valve state, a predetermined magnetic flux running along the magnetic path becoming saturated at the protrusion, and the protrusion having a predetermined sectional area allowing saturation of the magnetic flux.

2. The valve arrangement as claimed in claim 1, wherein the protrusion has a protrudent amount greater than the predetermined clearance.

3. The valve arrangement as claimed in claim 2, wherein the protrusion is arranged at a center portion of the plunger at the one end thereof.

4. The valve arrangement as claimed in claim 3, wherein the protrusion is circular in cross section.

5. The valve arrangement as claimed in claim 1, wherein the protrusion comprises a plurality of portions arranged symmetrically with respect to an axis of the plunger.

6. The valve arrangement as claimed in claim 1, wherein the magnetic material for the plunger comprises carbon-containing metal.

7. The valve arrangement as claimed in claim 4, further comprising a spring biasing the plunger in a valve-opening direction.

8. A solenoid valve, comprising:
a body with an end face;
a seat member slidably received in the body;
a moving part slidably received in the body, the moving part being provided with an end face;
a plunger slidably received in the body between the seat member and the moving part, the plunger having one end facing the end face of the moving part, the plunger being formed out of a magnetic material;
a protrusion formed at the one end of the plunger, the protrusion abutting on the end face of the moving part; and
a valve part arranged at another end of the plunger, the valve part abutting on the seat member,
a predetermined clearance being defined between the end face of the body and the end face of the moving part,
during energization, a predetermined magnetic path being formed from the body to the moving part, the predetermined magnetic path producing an attraction force between the body and the moving part across the predetermined clearance, the attraction force pressing the moving part toward the plunger, which makes the valve part abut on the seat member to provide a closed valve state,
a predetermined magnetic flux running along the magnetic path becoming saturated at the protrusion, and
the protrusion having a predetermined sectional area allowing saturation of the flux.

9. The solenoid valve as claimed in claim 1, wherein the protrusion has a protrudent amount greater than the predetermined clearance.

10. The solenoid valve as claimed in claim 9, wherein the protrusion is arranged at a center portion of the plunger at the one end thereof.

11. The solenoid valve as claimed in claim 10, wherein the protrusion is circular in cross section.

12. The solenoid valve as claimed in claim 8, wherein the protrusion comprises a plurality of portions arranged symmetrically with respect to an axis of the plunger.

13. The solenoid valve as claimed in claim 8, wherein the magnetic material for the plunger comprises carbon-containing metal.

14. The solenoid valve as claimed in claim 8, further comprising a spring interposed between the seat member and the plunger, the spring biasing the plunger in a valve-opening direction.

15. A valve arrangement, comprising:
a body with an end face;
a moving part slidably received in the body, the moving part being provided with an end face;
a plunger slidably received in the body, the plunger having one end facing an end face of the moving part, the plunger being formed out of a magnetic material; and
a protrusion formed at the one end of the plunger, the protrusion abutting on the end face of the moving part,
wherein a predetermined clearance is defined between the end face of the body and the end face of the moving part,
wherein during energization, a predetermined magnetic path is formed from the body to the moving part, the predetermined magnetic path producing an attraction force between the body and the moving part across the predetermined clearance, the attraction force pressing the moving part toward the plunger to provide a closed valve state,
wherein a predetermined magnetic flux running along the magnetic path becomes saturated at the protrusion,
wherein the protrusion has a predetermined sectional area allowing saturation of the magnetic flux, and
wherein the protrusion has a protrudent amount greater than the predetermined clearance.

16. A valve arrangement, comprising:
a body with an end face;
a moving part slidably received in the body, the moving part being provided with an end face;
a plunger slidably received in the body, the plunger having one end facing an end face of the moving part, the plunger being formed out of a magnetic material; and
a protrusion formed at the one end of the plunger, the protrusion abutting on the end face of the moving part,
wherein a predetermined clearance is defined between the end face of the body and the end face of the moving part,
wherein during energization, a predetermined magnetic path is formed from the body to the moving part, the predetermined magnetic path producing an attraction force between the body and the moving part across the predetermined clearance, the attraction force pressing the moving part toward the plunger to provide a closed valve state,
wherein a predetermined magnetic flux running along the magnetic path becomes saturated at the protrusion,
wherein the protrusion has a predetermined sectional area allowing saturation of the magnetic flux,
wherein the protrusion has a protrudent amount greater than the predetermined clearance,
wherein the protrusion is arranged at a center portion of the plunger at the one end thereof, and
wherein the protrusion is circular in cross section.

* * * * *